(12) United States Patent
Joo et al.

(10) Patent No.: US 11,135,497 B2
(45) Date of Patent: Oct. 5, 2021

(54) DEVICE FOR SENSING MOVING BALL AND METHOD FOR THE SAME

(71) Applicant: GOLFZON CO., LTD., Daejeon (KR)

(72) Inventors: Sang Hyun Joo, Daejeon (KR); Se Hwan Kim, Daegu (KR)

(73) Assignee: GOLFZON CO., LTD., Daejeon (KR)

( * ) Notice: Subject to any disclaimer, the term of this patent is extended or adjusted under 35 U.S.C. 154(b) by 10 days.

(21) Appl. No.: 15/579,949

(22) PCT Filed: Jun. 10, 2016

(86) PCT No.: PCT/KR2016/006189
§ 371 (c)(1),
(2) Date: Dec. 6, 2017

(87) PCT Pub. No.: WO2016/200208
PCT Pub. Date: Dec. 15, 2016

(65) Prior Publication Data
US 2018/0221746 A1    Aug. 9, 2018

(30) Foreign Application Priority Data
Jun. 12, 2015 (KR) .................. 10-2015-0083296

(51) Int. Cl.
*A63B 69/36* (2006.01)
*G06T 7/246* (2017.01)
(Continued)

(52) U.S. Cl.
CPC .......... *A63B 69/3658* (2013.01); *G01S 13/50* (2013.01); *G06T 7/248* (2017.01);
(Continued)

(58) Field of Classification Search
CPC ...... A63B 69/36; A63B 69/3658; G06T 7/248
See application file for complete search history.

(56) References Cited

U.S. PATENT DOCUMENTS 5,471,383 A    11/1995    Gobush et al.
6,031,933 A *  2/2000    Kumagai ............. A63B 47/008
                                                          356/426
(Continued)

FOREIGN PATENT DOCUMENTS

JP    2004-184236 A    7/2004
JP    2013-535715 A    9/2013
(Continued)

OTHER PUBLICATIONS

International Search Report for PCT/KR2016/006189 dated Sep. 13, 2016 from Korean Intellectual Property Office.

*Primary Examiner* — Eugene L Kim
*Assistant Examiner* — Christopher Glenn
(74) *Attorney, Agent, or Firm* — Revolution IP, PLLC

(57) ABSTRACT

Disclosed herein are a device and method for sensing a moving ball configured to analyze continuously acquired images of the moving ball and to calculate information about the spin of the moving ball based on the analysis result. It is possible to calculate the spin of the moving ball without providing a specific marker on the ball. In the case in which a logo or a brand mark is present on the ball, or in which dimples or cracks, which are feature portions in an image, are also present on the ball, it is possible to easily, rapidly, and accurately calculate the spin of the moving ball using the same.

8 Claims, 10 Drawing Sheets

(51) Int. Cl.
*G06T 7/60* (2017.01)
*G01S 13/50* (2006.01)
(52) U.S. Cl.
CPC ............ *G06T 7/60* (2013.01); *A63B 2220/35* (2013.01); *A63B 2220/89* (2013.01); *G06T 2207/30204* (2013.01); *G06T 2207/30224* (2013.01)

(56) References Cited

U.S. PATENT DOCUMENTS

| | | | | |
|---|---|---|---|---|
| 2002/0022531 | A1* | 2/2002 | Katayama | A63B 24/0021 473/151 |
| 2004/0247170 | A1* | 12/2004 | Furze | G01B 11/25 382/141 |
| 2006/0008116 | A1* | 1/2006 | Kiraly | G06T 7/20 382/103 |
| 2006/0030429 | A1* | 2/2006 | Rankin | A63B 24/0021 473/407 |
| 2007/0060410 | A1* | 3/2007 | Gobush | A63B 24/0021 473/140 |
| 2007/0238539 | A1* | 10/2007 | Dawe | A63B 24/0003 473/131 |
| 2010/0067742 | A1 | 3/2010 | Ogawa | |
| 2010/0210377 | A1* | 8/2010 | Lock | A63B 24/0006 473/409 |
| 2012/0082347 | A1* | 4/2012 | Kim | A63B 24/0006 382/107 |
| 2012/0220385 | A1* | 8/2012 | Richardson | A63F 13/812 473/156 |
| 2012/0270671 | A1* | 10/2012 | Ko | A63B 37/0003 473/199 |
| 2013/0135466 | A1* | 5/2013 | Kim | G06T 7/246 348/142 |
| 2014/0010409 | A1 | 1/2014 | Yamashita | |
| 2014/0301598 | A1* | 10/2014 | Marty | G06T 7/246 382/103 |
| 2015/0350609 | A1 | 12/2015 | Kim | |

FOREIGN PATENT DOCUMENTS

| | | | | |
|---|---|---|---|---|
| KR | 10-2010-0031481 A | 3/2010 | | |
| KR | 10-2013-0094862 A | 8/2013 | | |
| KR | 101394271 B1 * | 5/2014 | ............ | G06T 7/593 |
| KR | 10-2014-0090010 A | 7/2014 | | |
| KR | 101461144 B1 * | 11/2014 | | |
| WO | WO-2014109546 A1 * | 7/2014 | ............ | G06T 7/246 |

* cited by examiner

[FIG. 1]
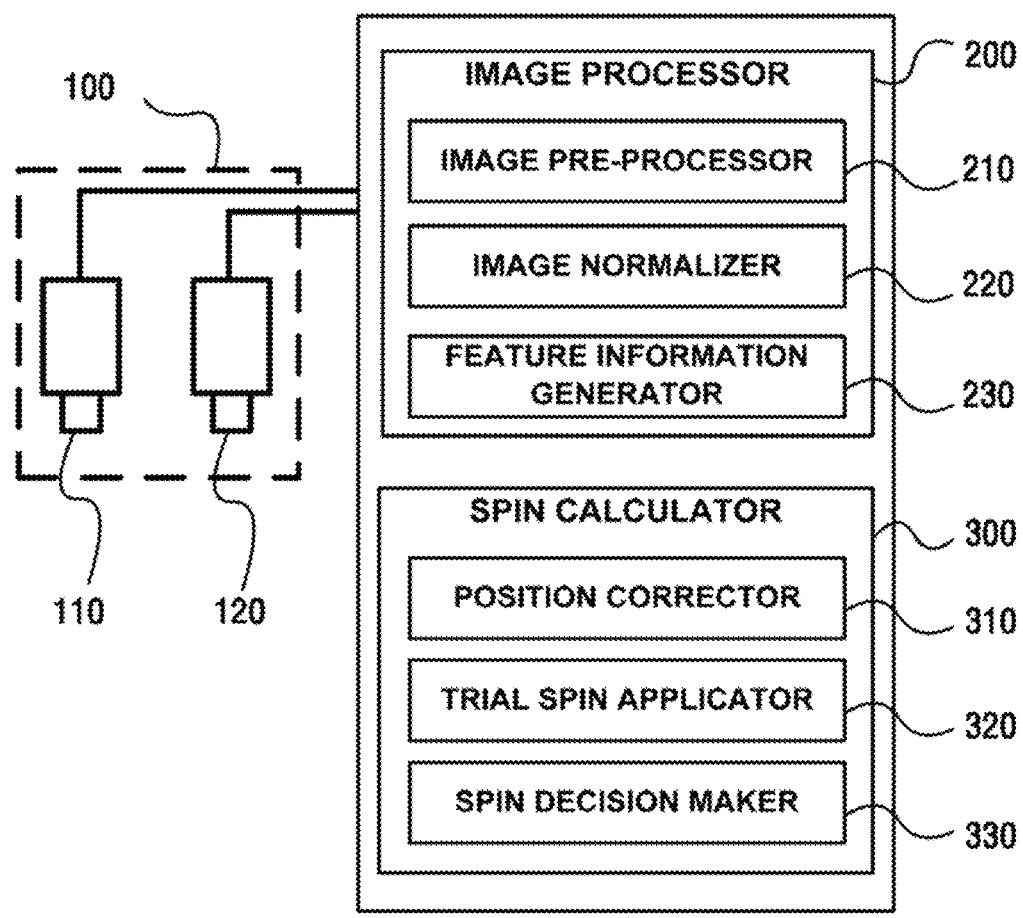

[FIG. 2]
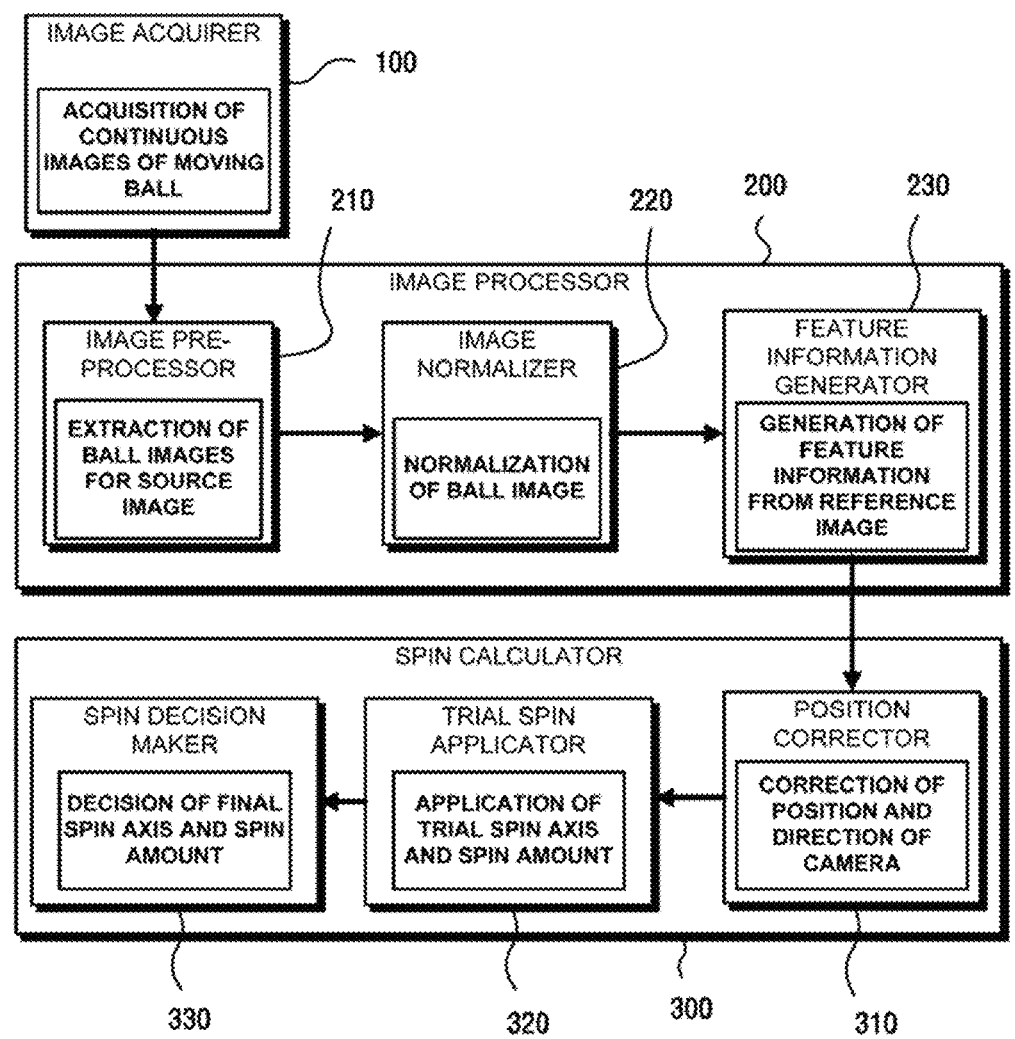

[FIG. 3]
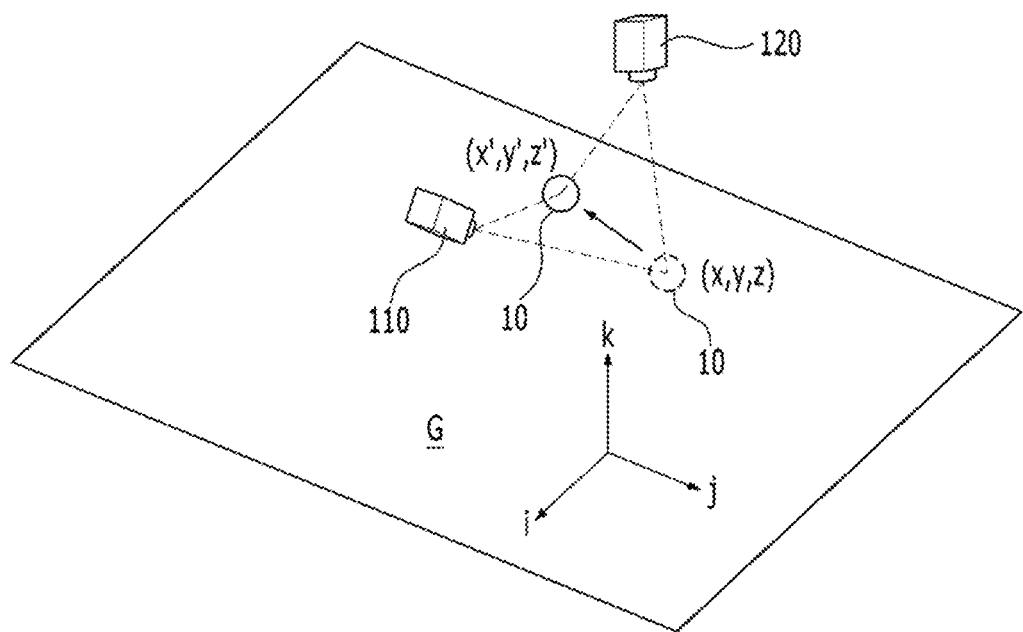

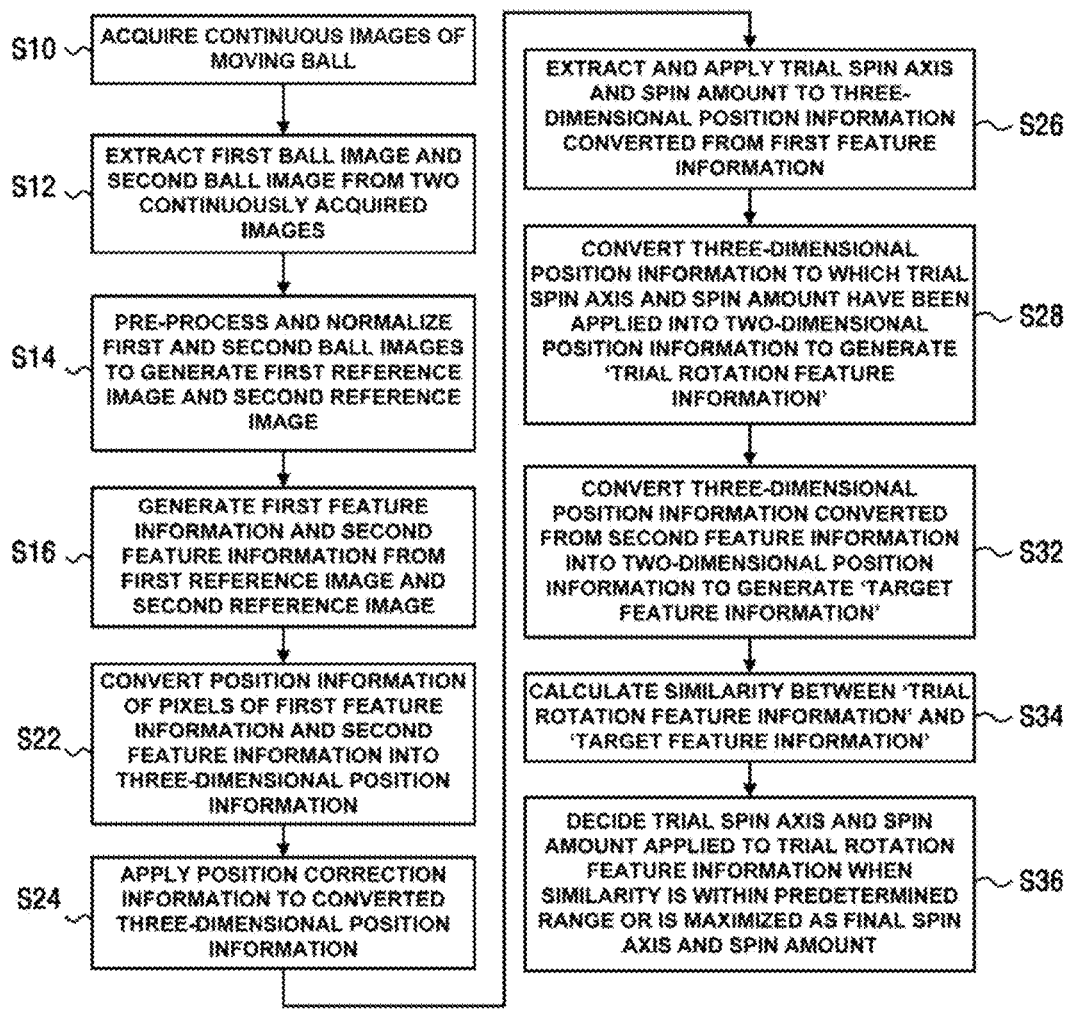
[FIG. 4]

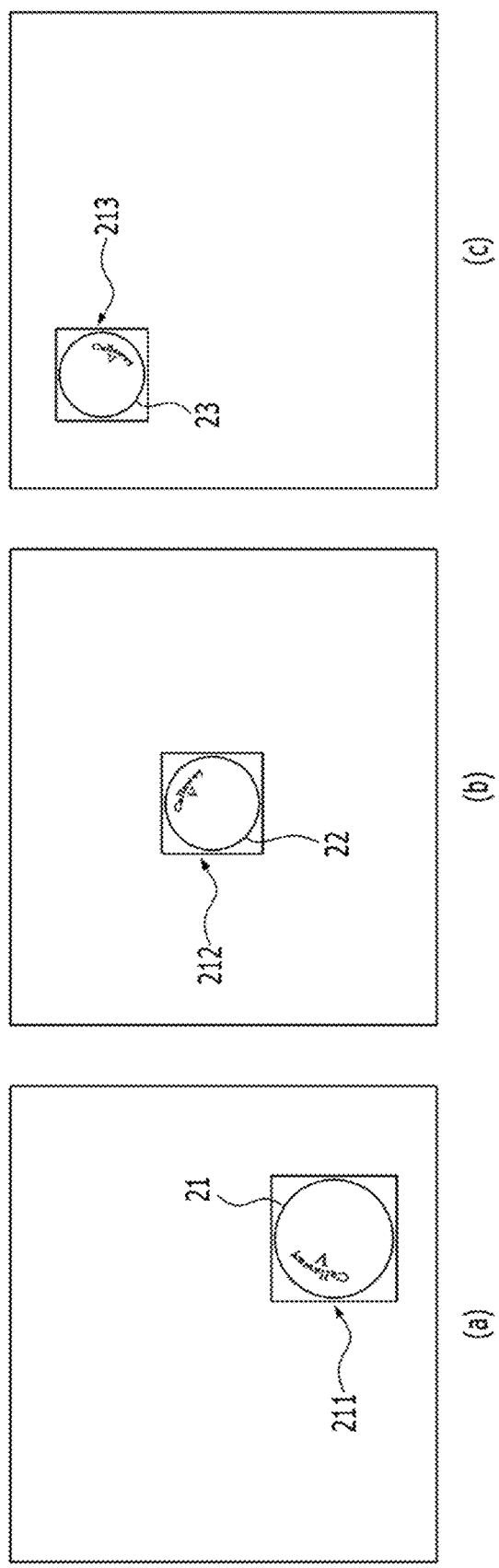
[FIG. 5]

[FIG. 6]
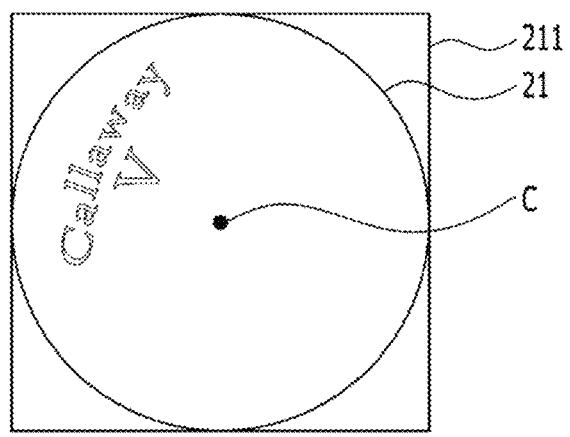
[FIG. 7]
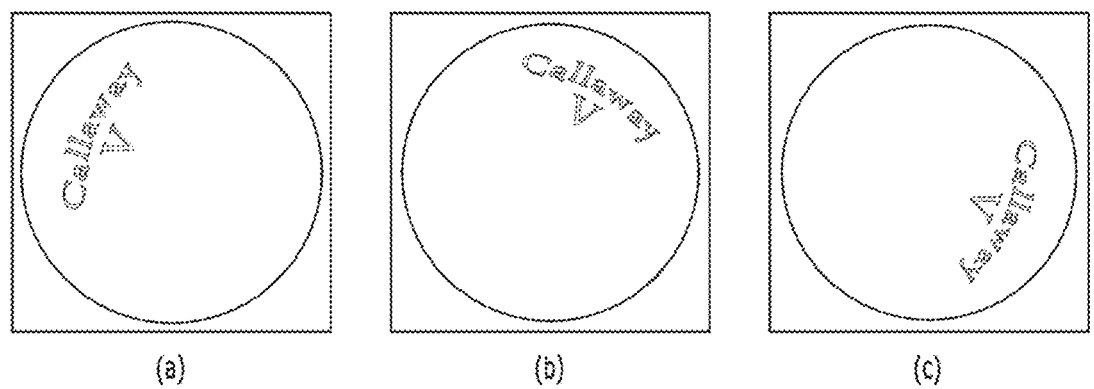
(a)　　　　　　　(b)　　　　　　　(c)

[FIG. 8]
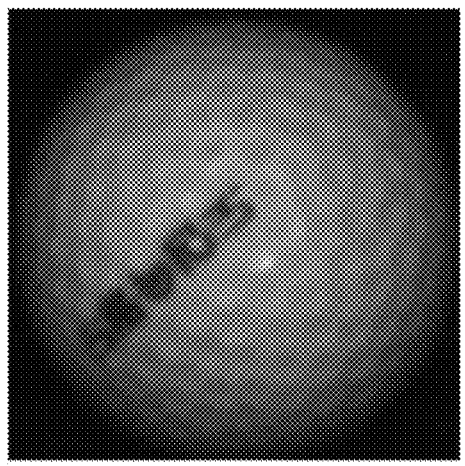
(a)
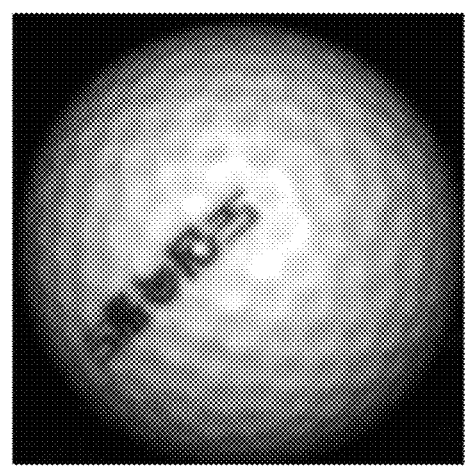
(b)
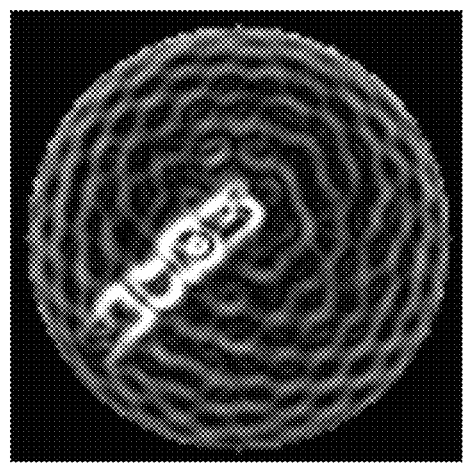
(c)
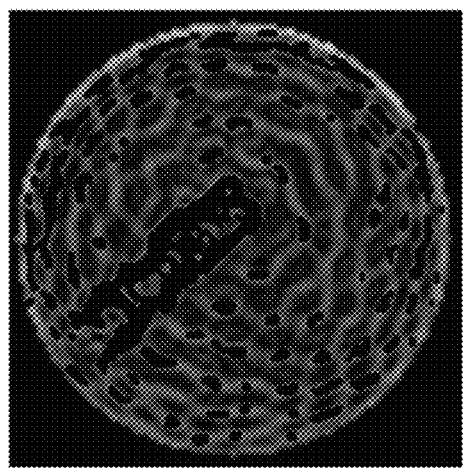
(d)

[FIG. 9]
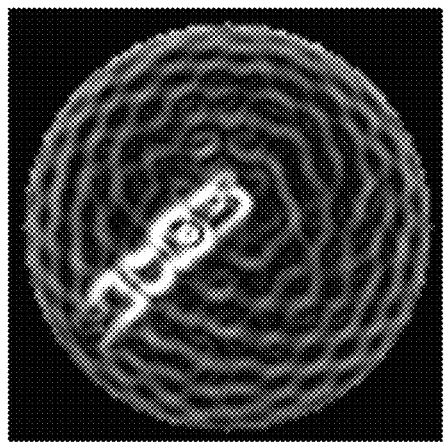
(a)
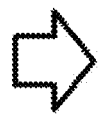
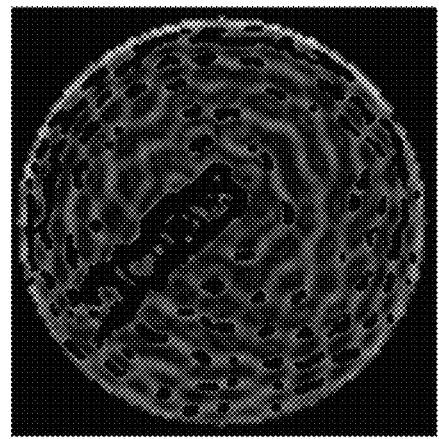
(b)
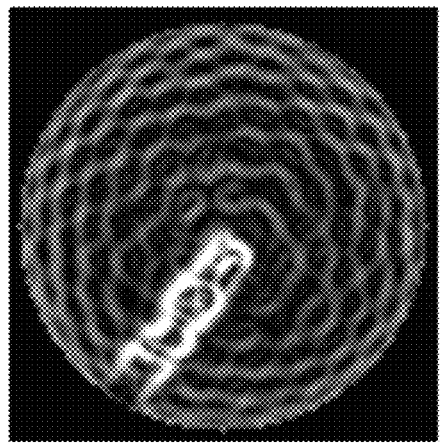
(c)
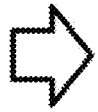
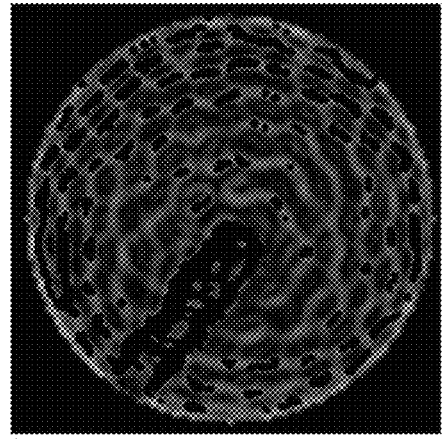
(d)

【FIG. 10】
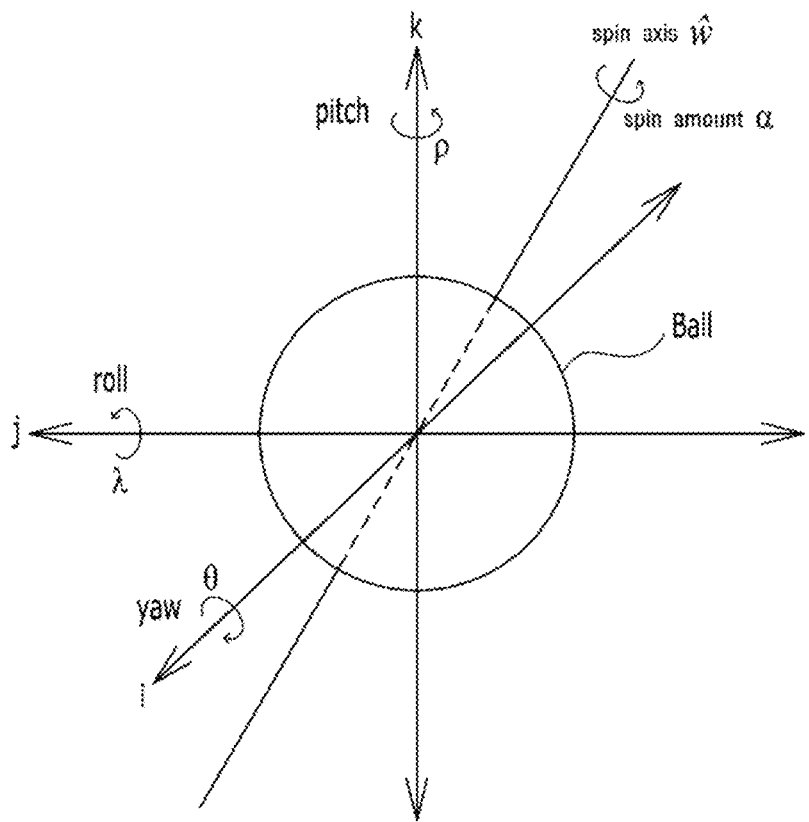
【FIG. 11】
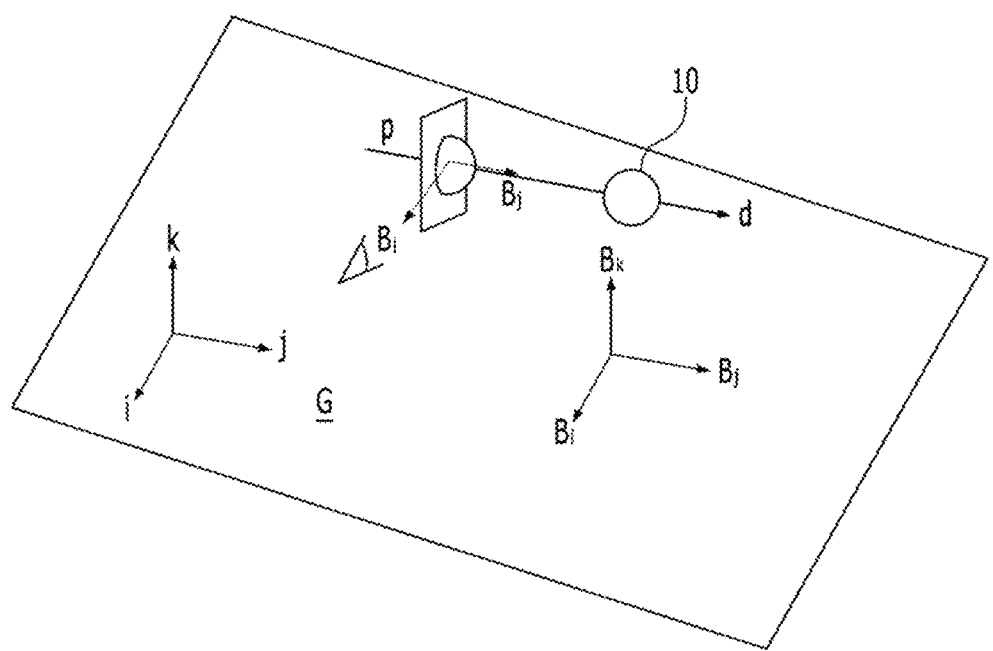

[FIG. 12]
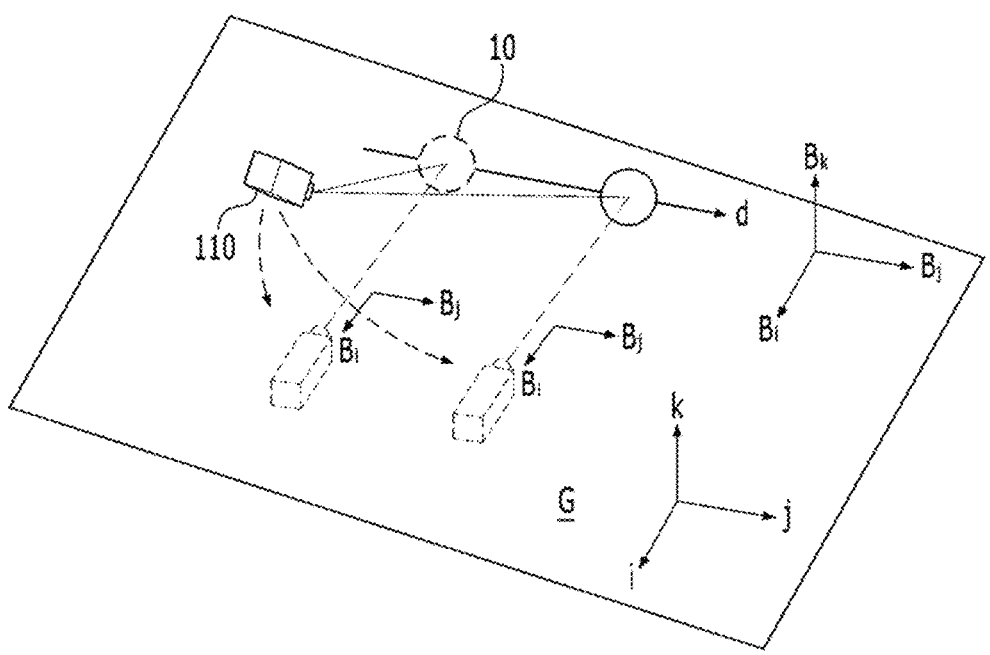

DEVICE FOR SENSING MOVING BALL AND METHOD FOR THE SAME

TECHNICAL FIELD

The present invention relates to a device and method for sensing a moving ball that acquire, process, and analyze images for the moving ball in order to calculate the spin of the ball.

BACKGROUND ART

Attempts have been made to accurately sense physical properties of a moving ball hit by a golfer in sports using balls, especially golf, to analyze the hit ball using the sensed value or to realize the hit ball as an image such that the image can be used in a simulation golf field, such as screen golf.

In particular, since the ball being moved by hitting is rotated about an axis in a three-dimensional space at a high speed, it is very difficult to measure the spin of the ball. Furthermore, expensive equipment is needed to accurately measure the spin of the ball. Typically, the spin of the ball may be measured using a radar sensor.

However, such an expensive sensing device is not suitable as one which is generally used to analyze a ball hit by a user in a so-called screen golf system or golf driving range, in which the ball hit according to a golf swing of the user is sensed to calculate the trajectory of the ball, and golf simulation is performed to realize virtual golf based thereon. Therefore, there is a high necessity for technology that is capable of rapidly and accurately sensing the spin of a ball using a relatively inexpensive and low-performance system.

U.S. Pat. No. 5,471,383 (entitled MONITORING SYSTEM TO MEASURE AND DISPLAY FLIGHT CHARACTERISTICS OF MOVING SPORTS OBJECT) discloses a portable launch monitor that is capable of calculating the spin of a hit ball. Specifically, U.S. Pat. No. 5,471,383 discloses a system configured such that a specific fluorescent marker is intentionally provided on a ball, the fluorescent marker portion is recognized from a captured image, and the change of the recognized fluorescent marker portion is analyzed to calculate the spin of the ball.

However, that the spin of the ball can be recognized only when the specific marker is intentionally provided on the ball means that a user must practice golf shots using only balls having the specific marker provided thereon, which inconveniences users. Furthermore, if the specific marker provided on the ball is damaged or erased due to repetitive golf shots, it becomes impossible to calculate the spin of the ball.

Meanwhile, Japanese Patent Application Publication No. 2004-184236 (entitled METHOD OF MEASURING ROTATION AND FLIGHT CHARACTERISTICS OF SPHERE) discloses a method of calculating the spin of a golf ball using a non-specific feature portion, such as a brand mark, which is originally provided on the golf ball, i.e. which is not intentionally provided on the golf ball. Specifically, Japanese Patent Application Publication No. 2004-184236 discloses a method of converting captured two-dimensional images into virtual spheres in a three-dimensional space and calculating information about the rotation of the virtual spheres in the three-dimensional space in order to calculate the spin of each sphere.

Since it is possible to accurately calculate the spin of a moving ball, the technology disclosed in Japanese Patent Application Publication No. 2004-184236 may be preferably used. If the calculation speed is too slow even though the spin of the ball can be accurately calculated, however, a sensing device that is capable of calculating the spin of the ball is very restrictedly used and is never used in the case in which a user hits a golf ball at almost at the same time as the spin of the golf ball is calculated in order to simulate the trajectory of the ball, as in a virtual golf simulation system.

DISCLOSURE

Technical Problem

It is an object of the present invention to provide a device and method for sensing a moving ball configured to analyze continuously acquired images of the moving ball and to calculate information about the spin of the moving ball based on the analysis result, wherein the device and method for sensing the moving ball are capable of rapidly and accurately calculating the spin of the moving ball without providing a specific marker on the ball.

Technical Solution

In accordance with one aspect of the present invention, the above and other objects can be accomplished by the provision of a device for sensing a moving ball that acquires and analyzes an image of the moving ball to calculate the spin of the moving ball, the device including an image acquirer for acquiring continuous images of the moving ball, an image processor for processing a first image and a second image continuously acquired by the image acquirer in order to generate feature information for calculating information about the spin of the moving ball, and a spin calculator for determining whether it is suitable for information about a trial spin to be decided as final spin information according to a predetermined condition using the result of application of the trial spin to the feature information of the first image and the feature information of the second image in order to decide the final spin information.

The image processor may include a feature information generator for detecting image edge information from a first ball image extracted from the first image in order to generate first feature information therefrom and detecting image edge information from a second ball image extracted from the second image in order to generate second feature information therefrom.

The image processor may include an image pre-processor for extracting a ball image from the first image in order to generate a first ball image, extracting a ball image from the second image in order to generate a second ball image, and pre-processing the extracted first ball image and the extracted second ball image according to a predetermined condition, an image normalizer for normalizing the size and brightness of each of the first ball image and the second ball image in order to generate a first reference image from the first ball image and to generate a second reference image from the second ball image, and a feature information generator for detecting image edge information from the first reference image in order to generate first feature information therefrom and detecting image edge information from the second reference image in order to generate second feature information therefrom.

The first feature information and the second feature information, generated from the image edge information, may include at least one of image edge information about dimples of the ball, image edge information about a logo or a specific mark formed on the ball, or image edge information about cracks or foreign matter on the ball.

The first feature information and the second feature information may include coordinate values and edge intensity values of pixels detected according to a predetermined edge detection condition.

The first feature information and the second feature information may include coordinate values and edge intensity values of pixels having a predetermined range of edge intensity values, which are extracted from pixels detected according to a predetermined edge detection condition.

The spin calculator may include a trial spin applicator for converting coordinates of pixels corresponding to the first feature information into three-dimensional position information, applying trial spin information to the converted three-dimensional position information, and converting pixels to which the trial spin information has been applied into two-dimensional position information in order to generate trial rotation feature information, and a spin decision maker for comparing edge intensity values of the trial rotation feature information with edge intensity values of target feature information extracted from the second feature information in order to calculate similarity information and determining whether the trial spin information is suitable to be taken as final spin information using the calculated similarity information in order to decide the final spin information.

In accordance with another aspect of the present invention, there is provided a method of sensing a moving ball that acquires and analyzes an image of the moving ball to calculate the spin of the moving ball, the method including acquiring continuous images of the moving ball, processing a first image and a second image that have been continuously acquired in order to generate feature information for calculating information about the spin of the moving ball, and determining whether it is suitable for information about a trial spin to be decided as final spin information according to a predetermined condition using a result of application of the trial spin to the feature information of the first image and the feature information of the second image in order to decide the final spin information.

The step of generating the feature information for calculating the spin information of the ball may include detecting image edge information from a first ball image extracted from the first image in order to generate first feature information therefrom and detecting image edge information from a second ball image extracted from the second image in order to generate second feature information therefrom.

The step of generating the feature information for calculating the spin information of the ball may include normalizing the size and brightness of each of a first ball image extracted from the first image and a second ball image extracted from the second image according to a predetermined condition, generating a first reference image from the first ball image through the normalization and generating a second reference image from the second ball image through the normalization, detecting image edge information from the first reference image in order to generate first feature information therefrom, and detecting image edge information from the second reference image in order to generate second feature information therefrom.

The method may further include generating trial rotation feature information through the application of position correction information about the position and the direction of a camera for acquiring the image of the moving ball using the first feature information and trial spin information in a three-dimensional space, generating target feature information through the use of the second feature information and the application of the position correction information, and comparing edge intensity values of the trial rotation feature information with edge intensity values of the target feature information in order to calculate similarity information and determining whether the trial spin information is suitable to be taken as final spin information using the calculated similarity information in order to decide the final spin information.

The step of generating the trial rotation feature information may include converting coordinates of pixels corresponding to the first feature information into three-dimensional coordinates, applying the position correction information to the pixels that have been converted into the three-dimensional coordinates, applying trial spin information to the coordinate information of the pixels to which the position correction information has been applied, and converting pixels to which the trial spin information has been applied into two-dimensional position information in order to generate the trial rotation feature information.

The step of deciding the final spin information may include repeatedly performing the step of generating the trial rotation feature information from different pieces of trial spin information a predetermined number of times in order to calculate similarity information and deciding trial spin information having a maximum value, among the similarity information calculated by repeatedly performing the step of generating the trial rotation feature information, as the final spin information.

The step of deciding the final spin information may include presetting a reference value of the similarity information to be decided as the final spin information, repeatedly applying the trial spin information until the calculated similarity information is equal to or greater than the preset reference value, and deciding trial spin information having similarity information equal to or greater than the preset reference value as the final spin information.

Advantageous Effects

A device and method for sensing a moving ball according to the present invention are configured to analyze continuously acquired images of the moving ball and to calculate information about the spin of the moving ball based on the analysis result. According to the present invention, it is possible to calculate the spin of the moving ball without providing a specific marker on the ball. In the case in which a logo or a brand mark is present on the ball, or in which dimples or cracks, which are feature portions in an image, are also present on the ball, it is possible to easily, rapidly, and accurately calculate the spin of the moving ball using the same.

DESCRIPTION OF DRAWINGS

FIG. 1 is a block diagram schematically showing the configuration of a device for sensing a moving ball according to an embodiment of the present invention;

FIG. 2 is a view illustrating a function of each component from image acquisition to ball spin calculation using the configuration shown in FIG. 1;

FIG. 3 is a view showing a stereo camera as an image acquirer according to the present invention and a moving ball;

FIG. 4 is a flowchart illustrating a method of sensing a moving ball according to an embodiment of the present invention;

FIG. 5 shows images (a) to (c) having ball portions extracted from images of a moving ball, within an angle of view of a camera of the sensing device according to the embodiment of the present invention, acquired using the camera at predetermined time intervals;

FIG. 6 is a view illustrating an exemplary method of extracting the ball portions as shown in FIG. 5;

FIG. 7 shows images (a) to (c) obtained by normalizing the size and brightness of ball images corresponding to the images of FIG. 5;

FIG. 8 shows an image (a) showing an example of a ball image extracted from a source image, an image (b) showing an example of a reference image obtained by normalizing the ball image shown in the image (a), an image (c) showing the state in which an edge is detected from the reference image shown in the image (b) according to a predetermined criterion, and an image (d) showing feature information extracted from information about the detected edge shown in the image (c) according to a predetermined condition;

FIG. 9 shows an image (a) showing the state in which a first reference image is generated from a first ball image and an edge is detected from the first reference image, an image (b) showing first feature information generated by detecting pixels corresponding to a predetermined upper-level range from information about the detected edge shown in the image (a), an image (c) showing the state in which a second reference image is generated from a second ball image and an edge is detected from the second reference image, and an image (d) showing second feature information generated by detecting pixels corresponding to a predetermined upper-level range from information about the detected edge shown in the image (c);

FIG. 10 is a view illustrating calculation of the spin of a moving ball; and

FIGS. 11 and 12 are views illustrating a principle of correcting the position and direction of a camera to calculate the spin of a ball.

BEST MODE

Hereinafter, exemplary embodiments of a device and method for sensing a moving ball according to the present invention will be described in detail with reference to the accompanying drawings.

In the present invention, basically, an image of a golf ball (hereinafter, referred to as a "ball") hit by a user using a golf club is captured by a predetermined camera, and the captured image is analyzed to calculate the spin of the hit ball. The camera may be a stereo camera, including a plurality of cameras, that is capable of acquiring a stereoscopic image or a three-dimensional (3D) camera that is capable of converting the coordinates of a ball in a two-dimensional (2D) image into 3D coordinates or converting 3D coordinates into 2D coordinates.

In addition, the device and method for sensing the moving ball according to the present invention may be applied to various fields, such as analysis of a ball hit according to a golf swing of a user or virtual golf using simulation based on virtual reality.

First, a device for sensing a moving ball according to an embodiment of the present invention will be described with reference to FIGS. 1 and 2.

As shown in FIGS. 1 and 2, a device for sensing a moving ball according to an embodiment of the present invention includes an image acquirer 100, an image processor 200, and a spin calculator 300.

The image acquirer 100 may be embodied by a camera device, such as a stereoscopic camera device or a 3D camera device, as previously described. As shown in FIG. 1, the image acquirer 100 is a stereoscopic camera device including a first camera 110 and a second camera 120.

The image processor 200 is a component that processes images acquired by the image acquirer 100. The image processor 200 may include an image pre-processor 210, an image normalizer 220, and a feature information generator 230.

The image pre-processor 210 performs pre-processing for extracting an image of a ball, i.e. a ball image, from each of the images continuously acquired by the image acquirer 100 and extracting a feature portion from each extracted ball image.

Meanwhile, in an image acquired from a moving ball, the brightness of the ball is variously changed depending on the position of the ball, the luminous intensity of light, the characteristics of a camera lens, external light, the color of the ball, the material of the ball, etc.

In order to calculate the spin of the moving ball using the image processing method according to the present invention, it is necessary to compare ball images in two images continuously captured under the same condition with each other. For this reason, it is necessary to make uniform the position of the ball, the luminous intensity of illumination, etc., as described above. To this end, the image normalizer 220 performs image normalization for normalizing the size and brightness of the ball images pre-processed by the image pre-processor 210.

Image pre-processing performed by the image pre-processor 210 and the image normalization performed by the image normalizer 220 will be described in more detail below.

Meanwhile, the feature information generator 230 extracts edge information from each ball image pre-processed by the image pre-processor 210 and normalized by the image normalizer 220 as described above (hereinafter, referred to as a "reference image") in order to generate "feature information," which will be described in more detail below.

Meanwhile, the spin calculator 300 is a component that calculates the amount of rotation of the moving ball about a specific spin axis, i.e. information about the spin axis and the spin amount of the moving ball, using the "feature information" generated from each of two arbitrary continuous ball images.

As shown in FIG. 1, the spin calculator 300 may include a position corrector 310, a trial spin applicator 320, and a spin decision maker 330.

The position corrector 310 corrects the position of the camera such that the spin of the ball is accurately calculated in the state in which the camera is directed to balls in two continuous images at the same angle in the same relative coordinate system, which will be described in more detail below.

Meanwhile, in the present invention, basically, images of the moving ball that are continuously captured are analyzed in pairs. On the assumption that the first one of the continuously acquired images is a first image and the second one of the continuously acquired images is a second image, the spin of the ball is calculated based on the state of the ball when the first image is acquired and on the state of the ball when the second image is acquired.

Predetermined image processing is performed on the ball in the first image in order to extract first feature information, and predetermined image processing is performed on the ball in the second image in order to extract second feature information. A function value for determining whether it is suitable for information about a trial spin to be decided as final spin information using the result of the application of the trial spin to the first feature information and the second feature information is calculated.

Of function values calculated by repeatedly applying the trial spin information a predetermined number of times, trial spin information when any of the function values has the maximum value is decided as final spin information. Alternatively, an appropriate reference value is preset for the function values, and when a function value calculated by applying the trial spin information is equal to or greater than the reference value, the trial spin information is decided as final spin information, whereby the spin of the ball is calculated.

The trial spin applicator 320 is configured to extract and apply information about a trial spin axis and a trial spin amount in order to find a spin axis and a spin amount at which the ball in the first image is changed to the ball in the second image by the spin of the ball, as described above. The spin decision maker 330 determines whether information about the trial spin axis and the trial spin amount applied by the trial spin applicator 320 approximate information about a desired spin axis and a desired spin amount in order to calculate final spin information.

That is, the trial spin applicator 320 extracts and applies new information about a trial spin axis and a trial spin amount every time until the final spin information is calculated, and the spin decision maker 330 checks the applied result to decide the most appropriate trial spin information as final spin information, which will be described in more detail below.

As shown in FIG. 3, position information at positions at which images are acquired according to the movement of a ball 10 can be recognized from ball images acquired by the first camera 110 and the second camera 120 based on an i, j, and k coordinate system with respect to the ground G.

That is, the first camera 110 and the second camera 120 constitute a stereoscopic image acquisition device. Consequently, it is possible to extract three-dimensional coordinate information of a subject from the images of the same subject acquired by the two cameras. Referring to FIG. 3, as the ball 10 moves from a first position to a second position, the coordinate information (x, y, z) of the first position and the coordinate information (x', y', z') of the second position can be extracted.

At this time, the first camera 110 and the second camera 120 are fixed, and therefore it is possible to recognize the position coordinates of the first camera 110 and the second camera 120.

Meanwhile, an image processing method according to an embodiment of the present invention will be described with reference to the flowchart shown in FIG. 4. The image processing method according to the flowchart shown in FIG. 4 will be described with reference to FIGS. 5 to 12.

First, continuous images of a moving ball are acquired by the image acquirer (S10).

Here, some of the images of the moving ball, continuously acquired by any one camera as shown in FIG. 3, can be seen as shown in FIGS. 5(a) to 5(c).

That is, FIGS. 5(a) to 5(c) are views showing images having only ball portions 21, 22, and 23 obtained by removing background portions from images for a moving ball within an angle of view of a fixed camera acquired using the camera at predetermined time intervals based on differences between images, etc.

It can be seen from FIGS. 5(a), 5(b), and 5(c) that the ball is flying diagonally to the left. As the ball approaches the camera, the ball portion 21 appears large as shown in FIG. 5(a), and as the ball gradually becomes distant from the camera, the ball portions 22 and 23 gradually appears smaller as shown in FIGS. 5(b) and 5(c).

Hereinafter, images having only moving portions, i.e. ball portions, obtained by removing background portions and various noise portions from the images shown in FIGS. 5(a), 5(b), and 5(c), i.e. the initially acquired images, based on differences between images will be referred to as source images.

In order to calculate the spin of the ball by applying the trial spin information described above and determining whether the applied trial spin information is the same as actual spin information, it is necessary to effectively extract only images about the ball portions 21, 22, and 23, i.e. only the ball images, from the source images shown in FIG. 5.

FIGS. 5(a) to 5(c) show a process of extracting only the ball portions from the respective source images. First, the ball portions 21, 22, and 23 may be found from the source images, and then the ball portion 21 may be accurately extracted such that the center point C of the ball portion 21 is the center point of an image 211 to be extracted and the contour of the ball portion 21 is substantially tangential to the contour of the image 211 to be extracted as shown in FIG. 6.

That is, in the image processing method according to the embodiment of the present invention, source images may be extracted from the two images continuously acquired at step S10, and a first ball image and a second ball image may be extracted from the source images (S12).

Here, the ball image extracted from the source image of the first acquired image is referred to as a first ball image, and the ball image extracted from the source image of the second acquired image is referred to as a second ball image.

Images obtained by extracting only the ball portions 21, 22, and 23 from the respective source images using the above method, i.e. ball images 211, 212, and 213, have sizes corresponding to those of the balls in the respective source images. Consequently, the ball images 211, 212, and 213 may have different sizes. In addition, the intensities of light irradiated to the ball portions 21, 22, and 23 in the respective source images are different from one another based on the distances from the camera. As a result, the ball images have different degrees of brightness.

In order to accurately extract feature information, it is necessary to equalize the sizes of the respective ball images 211, 212, and 213 and to normalize the brightness of the respective ball images 211, 212, and 213.

In the image processing method according to the embodiment of the present invention, image pre-processing and image normalization may be performed on the first ball image and the second ball image extracted at step S12 in order to generate a first reference image from the first ball image and to generate a second reference image from the second ball image (S14).

FIG. 7(a) is a view showing a ball image normalized so as to have the same size and brightness as the ball image 211 shown in FIG. 5(a), FIG. 7(b) is a view showing a ball image normalized so as to have the same size and brightness as the ball image 212 shown in FIG. 5(b), and FIG. 7(c) is a view showing a ball image normalized so as to have the same size and brightness as the ball image 213 shown in FIG. 5(c).

That is, the respective ball images 211, 212, and 213 shown in FIGS. 5(a) to 5(c) may be enlarged or reduced to a predetermined size, or two of the ball images 211, 212, and 213 may be enlarged or reduced based on the other one of the ball images 211, 212, and 213. That is, the respective ball images may be normalized such that the respective ball images have the same size.

In addition, hot pixels that are present, particularly, in the central part of the ball may be removed from the respective ball images, and the respective ball images may be normalized using the average value of pixels constituting the ball portions such that the respective ball images have the same degree of brightness.

In the same manner as the manner in which the ball images 211, 212, and 213 shown in FIGS. 5(a) to 5(c) are processed into the ball images shown in FIGS. 7(a) to 7(c) as described above, after the ball images are normalized, feature information is generated from the respective normalized ball images (hereinafter, a ball image, the size and brightness of which are normalized as described above, will be referred to as a "reference image") by the feature information generator.

That is, in the image processing method according to the embodiment of the present invention, first feature information and second feature information may be generated from the first reference image and the second reference image extracted at step S14 (S16). The feature information may be generated by detecting image edge information.

FIG. 8(a) is a view showing an example of a ball image extracted from a source image, FIG. 8(b) is a view showing an example of a reference image obtained by normalizing the ball image shown in FIG. 8(a), FIG. 8(c) is a view showing the state in which an edge is detected from the reference image shown in FIG. 8(b) according to a predetermined criterion, and FIG. 8(d) is a view showing feature information extracted from information about the detected edge shown in FIG. 8(c) according to a predetermined condition.

In FIG. 8(c), the brightest portion in the circle is a portion corresponding to an image edge. In FIG. 8(d), the darkest portion in the circle is a portion corresponding to feature information extracted from the edge information.

In the case in which the moving ball is a golf ball, the edge information may be image edge information about dimples, image edge information about cracks in the golf ball present on the dimples, or image edge information about a logo or a specific mark on the golf ball present on the dimples.

FIG. 8(c) shows edge information detected from the dimples and logo on the ball.

Here, the edge is a spot at which brightness is abruptly changed within a predetermined region, and conditions for edge detection may be preset in order to detect the edge from the reference image, as shown in FIG. 8(c).

The edge information has information about the coordinates of detected pixels and an edge intensity value expressed as the brightness of each pixel.

In the present invention, feature information is generated using the edge intensity values, as shown in FIG. 8(d). Although the coordinate information and the edge intensity values of all of the pixels detected as the edge may be used as the feature information, only some of the pixels corresponding to the detected edge may be extracted, and the coordinate information and the edge intensity values of the extracted pixels may be generated as the feature information in order to reasonably reduce the calculation amount for spin calculation.

In FIG. 8(d), for the sake of convenience, the portion corresponding to the feature information is shown to be the darkest in the circle in order to visually express the feature information extracted from the detected edge information Pixels to be generated as the feature information may be selected depending on the edge intensity values, i.e. the brightness values of the pixels constituting the edge. For example, pixels of which the edge intensity values of the detected edge information correspond to a predetermined upper-level range may be selected and used as the feature information. Alternatively, a range of edge intensity values may be predefined, and pixels having edge intensity values corresponding to the defined range may be extracted and used as the feature information. The range of edge intensity values may be appropriately set based on repeated testing and experiences.

When the feature information is generated as described above, the generated feature information includes information about the coordinates of pixels extracted based on the edge intensity values and information about edge intensity values of the pixels.

In the present invention, a first ball image and a second ball image are extracted from two adjacent ones of the continuously acquired images of a moving ball, a first reference image and a second reference image are generated respectively from the first ball image and the second ball image through image pre-processing and normalization, an edge is detected from the first reference image in order to generate first feature information, an edge is detected from the second reference image in order to generate second feature information, and similarity therebetween is calculated using the first feature information and the second feature information in order to decide final spin information.

Here, the calculated similarity may be a value based on a predetermined function, which may be an example of a function value for determining whether it is suitable for the trial spin information to be decided as final spin information using the result of the application of the trial spin information after the trial spin is applied to the first feature information and the second feature information.

FIG. 9(a) is a view showing the state in which a first reference image is generated from the first ball image described above and an edge is detected from the first reference image.

FIG. 9(c) is a view showing the state in which a second reference image is generated from the second ball image described above and an edge is detected from the second reference image.

FIG. 9(b) is a view showing first feature information generated by detecting pixels corresponding to a predetermined upper-level range from information about the detected edge shown in FIG. 9(a) (the darkest portion in the circle shown in FIG. 9(b)), and FIG. 9(d) is a view showing second feature information generated by detecting pixels corresponding to a predetermined upper-level range from information about the detected edge shown in FIG. 9(c) (the darkest portion in the circle shown in FIG. 9(d)).

In the present invention, information about the spin of the moving ball is calculated using the first feature information shown in FIG. 9(b) and the second feature information shown in FIG. 9(d).

When the first feature information and the second feature information are prepared, as described above, a process of calculating information about the spin of the moving ball by the spin calculator using the first feature information and the second feature information is carried out.

That is, referring to the flowchart shown in FIG. 4, the position information of the pixels of the first feature information and the second feature information is converted into three-dimensional position information (S22), and position correction information is applied to the converted three-dimensional position information (S24).

Subsequently, a trial spin axis and a trial spin amount are extracted and applied to the three-dimensional position information converted from the first feature information (S26), the three-dimensional position information to which the trial spin axis and the trial spin amount have been applied is converted into two-dimensional position information in order to generate "trial rotation feature information" (S28), and the three-dimensional position information converted from the second feature information is converted into two-dimensional position information in order to generate "target feature information" (S32).

Hereinafter, processes of generating the "trial rotation feature information" and the "target feature information" will be described.

The spin of the ball may be obtained by calculating information regarding the coordinates of a spin axis in a three-dimensional space based on an i-axis, j-axis, and k-axis coordinate system and information regarding a rotational angle about the spin axis, i.e. a spin amount, as shown in FIG. 10.

As shown in FIG. 10, the rotational motion in the three-dimensional space may include pitch, yaw, and roll components (for example, the ball has only side spin in the case in which the spin axis is aligned with the k axis, and the ball has only a back spin or a forward spin in the case in which the spin axis is aligned with the i axis). On the assumption that a rotation component in an i-axis direction is θ, a rotation component in a j-axis direction is λ, and a rotation component in a k-axis direction is ρ, vector ω of spin to be obtained may be represented by Equation 1 below.

$$\vec{\omega} = \theta i + \lambda j + \rho k \quad \text{[Equation 1]}$$

Information regarding the spin axis as represented by Equation 2 below and information regarding the spin amount as represented by Equation 3 below may be calculated from the spin vector ω. In the following equations, α indicates the information regarding the spin amount.

$$\hat{\omega} = \left(\frac{\theta}{\alpha}, \frac{\lambda}{\alpha}, \frac{\rho}{\alpha}\right) \quad \text{[Equation 2]}$$

$$\alpha = \sqrt{\theta^2 + \lambda^2 + \rho^2} \quad \text{[Equation 3]}$$

Consequently, the yaw rotation component θ of the spin of the moving ball, the roll rotation component λ of the spin of the moving ball, and the pitch rotation component ρ of the spin of the moving ball may be found in order to calculate the spin axis information and the spin amount information.

Calculation of the spin axis information and the spin amount information may be performed using the first feature information and the second feature information shown in FIGS. 9(b) and 9(d).

To this end, first, it is necessary to correct information about the positions of the pixels constituting the first feature information and the second feature information.

That is, since the spin axis and the spin amount of the ball in the images acquired by the camera are differently observed based on the direction in which the camera is directed, it is necessary to accurately establish a criterion and to calculate an absolute spin axis and spin amount based on the criterion. To this end, position and direction information of the camera is corrected for continuously acquired images as if the camera were viewing the ball at the same position and from the same direction so as to accurately calculate spin information of the ball.

FIGS. 11 and 12 are views illustrating the position correction principle.

In the sensing device and the sensing method according to the present invention, spin information is calculated from the change in position of pixels constituting feature information using two continuous images. In order to accurately calculate the spin information, it is necessary for the camera to view the ball at the same position and from the same direction in each pair of continuous images to be analyzed.

That is, it is necessary to correct continuously acquired images (a fixed camera captures the images of a moving ball while viewing the moving ball) as if the camera were always viewing the ball at the same position and from the same direction while moving with the ball.

As an example for establishing a criterion for the position and direction of the camera, the direction in which the camera views the ball along a vector component Bi parallel to the ground G while being included in a plane p perpendicular to a vector component Bj in the direction in which the ball 10 advances when the ball 10 is moved in a direction d as shown in FIG. 11 may become a criterion.

That is, it is necessary to generate position correction information for correcting the position and the direction of the camera 10 as if the camera were viewing the ball along a direction vector Bi parallel to the ground G while being perpendicular to a direction vector Bj along which the ball 10 is moved at each position captured by the camera 110 while the ball is moved in a direction d as shown in FIG. 12 and to apply the generated position correction information to calculation of the spin.

Such position correction may be performed by correcting the angle of the camera that is directed to the ball using information about the coordinates of the fixed camera and information about the coordinates of the center of the ball, which are already known. Instead of actually correcting the image as described above, the position correction may be performed by applying information about the corrected portions to the position coordinates of the pixels constituting the first feature information and the second feature information.

Meanwhile, information about the position of each of the pixels constituting the first feature information is converted into three-dimensional position information, information about the position correction described above is applied to the result, information about a trial spin axis and a trial spin amount is applied to the result, and the result is converted into two-dimensional position information, which will hereinafter be referred to as "trial rotation feature information."

Information about the position of each of the pixels constituting the second feature information is converted into three-dimensional position information, information about the position correction described above is applied to the result, and the result is converted into two-dimensional position information, which will hereinafter be referred to as "target feature information."

When the "trial rotation feature information" and the "target feature information" are generated as described above, the trial rotation feature information and the target feature information are compared with each other in order to calculate the extent to which the trial rotation feature information and the target feature information are similar to each other, i.e. similarity, as a value according to a predetermined function (see step S34 in the flowchart shown in FIG. 4).

The maximum value of the calculated similarity or a value that exceeds a predetermined reference value of the calculated similarity may be selected, and information about a trial spin axis and a trial spin amount applied to trial rotation feature information based on the selected value may be decided as final information about the trial spin axis and the trial spin amount (see step S36 in the flowchart shown in FIG. 4).

Here, the similarity between the trial rotation feature information and the target feature information may be calculated using an edge intensity value of each pixel of the trial rotation feature information and an edge intensity value of each pixel of the target feature information.

That is, the similarity may be calculated as a value indicating similarity obtained from the comparison between the edge intensity values of the corresponding pixels of the trial rotation feature information and the target feature information according to a predetermined function.

In order to determine whether or not the calculated value of the similarity is the maximum value, it is necessary to apply the trial spin axis and the trial spin amount several times. The number of times to apply the trial spin axis and the trial spin amount may be preset.

Alternatively, an appropriate reference value of the similarity may be set based on repeated testing and experiences, and the trial rotation feature information and the target feature information may be compared with each other. In the case in which the calculated value of the similarity exceeds the reference value, the spin axis and the spin amount applied to the trial rotation feature information may be decided as the final spin axis and the final spin amount.

Meanwhile, in the case in which the trial spin axis is applied at the step S26 of FIG. 4, all of the pitch component, the yaw component, and the roll component must be considered, as shown in FIG. 10, which means that a considerably large number of cases must be considered in order to extract the trial spin axis and the trial spin amount. Consequently, the restriction range thereof may be reasonably set. Even in the case in which the trial spin amount is applied, the restriction range thereof may also be reasonably set. Since information about the trial spin axis and the trial spin amount is extracted within the restriction range described above, the number of cases may be reduced, whereby the calculation load may be considerably reduced. Consequently, rapid spin calculation is possible.

That is, it is possible to set restriction conditions for extracting a trial spin axis and a trial spin amount in consideration of the kinetic properties of the ball and the frame speed of the camera, whereby rapid spin calculation is possible.

When a golf ball is hit using a golf club, among three rotation components of a spin shown in FIG. 9, a pitch rotation component and a yaw rotation component strongly appear, but a roll rotation component does not appear or is negligible.

That is, when the golf ball is hit, a left or right side spin and a forward or backward spin appears, but a rolling rotation component does not appear or is negligible.

Since a trial spin axis can be selected in consideration of the pitch rotation component and the yaw rotation component while ignoring the roll rotation component, therefore, it is possible to considerably reduce the number of cases for the trial spin axis.

Meanwhile, when a golf ball is hit using a golf club, it is not sufficient to calculate the extent of rotation of the ball from the state of the ball in a single frame image to the state of the ball in the next frame image.

That is, the spin of a ball hit by a user is limited, and the frame speed of the camera that acquires images is also limited. Consequently, the number of cases for a trial spin amount may be reduced therethrough.

Consequently, it is possible to preset the restriction range of the trial spin axis and the trial spin amount, as described above, whereby the calculation load is reduced and thus rapid spin calculation is possible.

Meanwhile, in the above description, the spin information is calculated using only two of the continuously acquired images. Meanwhile, some cameras may acquire a large number of frame images per second, ranging from several tens of frame images per second to several thousands of frame images per second. Alternatively, therefore, the spin calculation process may be performed on all of the continuous images acquired by the camera or on only some of the continuous images acquired by the camera.

In the case in which the first acquired image and the second acquired image of the two continuous images is set to a pair of images and the spin calculation process is performed on a plurality of pairs of images, a plurality of pieces of spin information calculated through the spin calculation process may be slightly different from each other. These pieces of spin information may be combined according to a predetermined function (for example, the average value may be calculated, or the average value of some pieces of spin information having the highest similarity may be calculated) in order to calculate final spin information, and pieces of spin information having the highest similarity, among the calculated pieces of spin information, may be selected as final spin information.

MODE FOR INVENTION

Various embodiments for carrying out the invention have been described in the best mode for carrying out the invention.

INDUSTRIAL APPLICABILITY

A device and method for sensing a moving ball according to the present invention are applicable to industries related to golf practice, in which the analysis of a ball hit according to a golf swing is performed, and so-called screen golf, in which a user may enjoy a round of virtual golf through golf simulation based on virtual reality.

The invention claimed is:

1. A device for sensing a golf shot induced moving ball by a golf shot that acquires and analyzes an image of the golf shot induced moving ball to calculate a spin of the golf shot induced moving ball, the device comprising:
   a camera for acquiring continuous images of the golf shot induced moving ball;
   an image processor configured to:
     extract a ball image from a first image in order to generate a first ball image and extract a ball image from a second image in order to generate a second ball image, wherein the first image and the second image are consecutively acquired by the camera,
     detect spots at which brightness is changed abruptly in a predetermined range as image edge information about a surface of the ball, from each of the first ball image and the second ball image, and
     detect pixels corresponding to a predetermined condition from the detected image edge information of the first ball image to generate a first feature information and detect pixels corresponding to the predetermined condition from the detected image edge information of the second ball image to generate a second feature information; and a spin calculator configured to:
  convert coordinates of pixels corresponding to the first feature information into three-dimensional position information,
  apply trial spin information to the converted three-dimensional position information,
  convert pixels to which the trial spin information has been applied into two-dimensional position information in order to generate trial rotation feature information,
  compare edge intensity values of the trial rotation feature information with edge intensity values of the second feature information in order to calculate similarity information, and
  determine whether the trial spin information is suitable to be taken as final spin information using the calculated similarity information in order to decide the final spin information.

2. The device according to claim 1, wherein the image processor comprises:
  an image pre-processor for pre-processing the extracted first ball image and the extracted second ball image according to a predetermined condition;
  an image normalizer for normalizing a size and brightness of each of the first ball image and the second ball image in order to generate a first reference image from the first ball image and to generate a second reference image from the second ball image; and
  a feature information generator for detecting image edge information from the first reference image in order to generate the first feature information therefrom and detecting image edge information from the second reference image in order to generate the second feature information therefrom.

3. The device according to claim 1, wherein the first feature information and the second feature information comprise coordinate values and edge intensity values of pixels detected according to a predetermined edge detection condition.

4. The device according to claim 1, wherein the first feature information and the second feature information comprise coordinate values and edge intensity values of pixels having a predetermined range of edge intensity values, which are extracted from pixels detected according to a predetermined edge detection condition.

5. The device according to claim 1, wherein the spin calculator is configured to:
  calculate position correction information for correcting a position and direction of a camera as if respective balls on consecutively acquired images are viewed at the same position and direction with respect to the camera,
  generate the trial rotation feature information by applying the calculated position correction information to the converted three-dimensional coordinates of pixels corresponding to the first feature information,
  convert coordinates of pixels corresponding to the second feature information into three-dimensional position information,
  apply the calculated position correction information to the converted three-dimensional coordinates of pixels corresponding to the second feature information,
  convert pixels to which the position correction information has been applied into two-dimensional position information in order to generate a target feature information,
  compare edge intensity values of the trial rotation feature information with edge intensity values of the target feature information in order to calculate similarity information, and
  determine whether the trial spin information is suitable to be taken as final spin information using the calculated similarity information in order to decide the final spin information.

6. The device according to claim 2, wherein the first feature information and the second feature information comprise coordinate values and edge intensity values of pixels detected according to a predetermined edge detection condition.

7. The device according to claim 2, wherein the first feature information and the second feature information comprise coordinate values and edge intensity values of pixels having a predetermined range of edge intensity values, which are extracted from pixels detected according to a predetermined edge detection condition.

8. The device according to claim 2, wherein the spin calculator is configured to:
  calculate position correction information for correcting a position and direction of a camera as if respective balls on consecutively acquired images are viewed at the same position and direction with respect to the camera,
  generate the trial rotation feature information by applying the calculated position correction information to the converted three-dimensional coordinates of pixels corresponding to the first feature information,
  convert coordinates of pixels corresponding to the second feature information into three-dimensional position information,
  apply the calculated position correction information to the converted three-dimensional coordinates of pixels corresponding to the second feature information,
  convert pixels to which the position correction information has been applied into two-dimensional position information in order to generate a target feature information,
  compare edge intensity values of the trial rotation feature information with edge intensity values of the target feature information in order to calculate similarity information, and
  determine whether the trial spin information is suitable to be taken as final spin information using the calculated similarity information in order to decide the final spin information.

* * * * *